Sept. 16, 1969   W. A. LAMBERTSON ETAL   3,467,745
METHOD OF FORMING HOT PRESSED REFRACTORY CARBIDE
BODIES HAVING SHAPED CAVITIES
Filed March 29, 1966

INVENTORS
WINGATE A. LAMBERTSON
BRUNO R. MICCIOLI
BY
*H. W. Brownell*
ATTORNEY

United States Patent Office 3,467,745
Patented Sept. 16, 1969

3,467,745
METHOD OF FORMING HOT PRESSED REFRACTORY CARBIDE BODIES HAVING SHAPED CAVITIES
Wingate A. Lambertson, Lexington, Ky., and Bruno R. Miccioli, North Tonawanda, N.Y., assignors to The Carborundum Company, Niagara Falls, N.Y., a corporation of Delaware
Filed Mar. 29, 1966, Ser. No. 538,341
Int. Cl. B29c 1/08
U.S. Cl. 264—317                  8 Claims

ABSTRACT OF THE DISCLOSURE

This invention relates to a method of forming hot pressed refractory carbide bodies having shaped cavities therein. According to one procedure, the refractory carbide powder to be hot pressed is placed in a mold together with a water-reactive carbide such as aluminum carbide, the latter being incorporated at locations and in amounts corresponding to the locations and size of the cavities desired in the hot pressed body. Following hot pressing, the water-reactive carbide may be leached out with water to leave the desired cavities. Instead of a water-reactive carbide, similar use may be made of a mixture which will form a water-reactive carbide under the conditions of hot pressing, e.g., a mixture of aluminum and carbon.

---

This invention relates to improvements in hot pressing refractory carbide bodies, and more particularly to a new and improved method of forming hot pressed refractory carbide bodies having shaped cavities.

A primary object of the present invention is to form a hot pressed refractory carbide body having a shaped cavity by filling the oversize cavity in the oversize body with a water-reactive carbide forming or containing mixture and by heating such body above the reactive carbide forming temperature prior to hot pressing to size and shape. Following such hot pressing, the mixture is readily removed by reacting the reactive carbide with water, thereby leaving a cavity of the desired size and shape in the hot pressed refractory carbide body.

Additional objects and advantages of the invention will become apparent upon consideration of the following detailed description and accompanying drawings, wherein.

Figures 1, 2, 3:
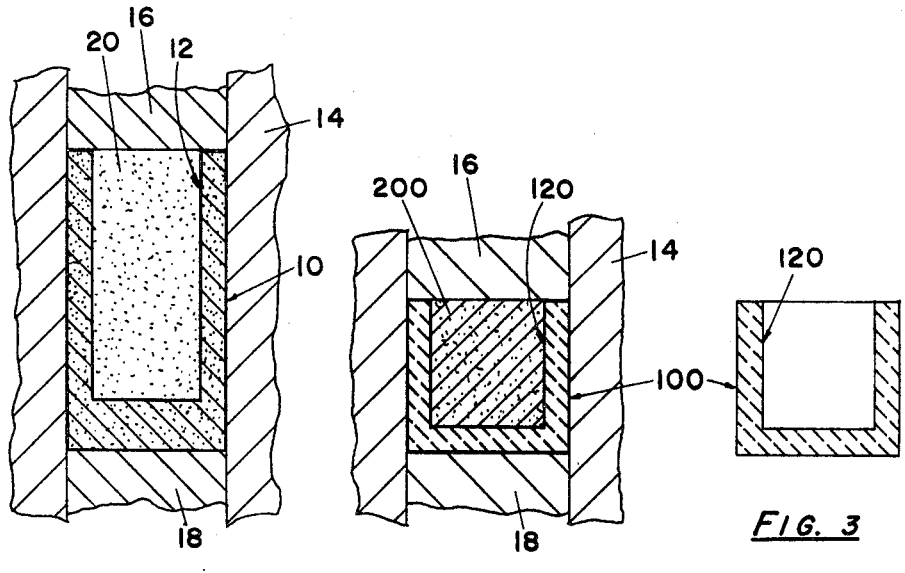
FIG. 1 is a fragmentary sectional view of an oversize cup-shaped refractory carbide body having an oversize cavity filled with a water-reactive carbide forming or containing mixture and placed in a mold prior to the hot pressing operation.
FIG. 2 is a view similar to FIG. 1, but following the hot pressing operation.
FIG. 3 is a sectional view of the hot pressed, cup-shaped body having a shaped cavity following removal of the filling.

Referring to FIGS. 1–3, which are generally to scale, the inventive method is shown as applied to forming a cup-shaped, hot pressed refractory carbide body having a shaped cavity in accordance with the following example.

EXAMPLE 1

239.3 grams of niobium carbide having a particle size of −325 mesh was mixed with 15 cc. of a 10 percent polyvinyl alcohol solution and cold pressed to form an oversize cup-shaped, cylindrical body 10 having the following approximate dimensions: an outer diameter of 1⅝ inches, an inner diameter of 1⅛ inches, an overall length of 3 inches and a bottom wall thickness of ½ inch, and being provided with an oversize cavity 12. After drying, body 10 was placed in a cylindrical graphite mold 14 having opposed plungers 16, 18 and its cavity 12 was filled with a water-reactive carbide containing mixture 20 of equal volumes of calcium carbide having a particle size range of +60 −40 mesh and 20 grams of amorphous carbon having a particle size range of +600 −325 mesh. Body 10 was heated in an induction furnace (not shown) under argon and no applied positive mechanical pressure until the temperature reached 1000° C. At this point, while the heating continued, the plungers 16, 18 were actuated by suitable means (not shown) to maintain contact pressure with body 10 and which pressure was gradually increased from 1400° C. to a maximum of 3000 pounds per square inch at the hot pressing temperature of 2000° C. This maximum pressure was held at 2000° C. for 20 minutes until the hot pressing operation was completed, with the total time of the run being 80 minutes. The furnace was shut off and the pressure released during cooling.

As shown in FIG. 2, the hot pressed refractory carbide body 100 was reduced to the desired size and shape, having about the same outer and inner diameters as body 10, but a reduced length of about 1½ inches, and a reduced bottom wall thickness of about ¼ inch. At the same time, the cavity 120 was also reduced to the desired size and shape, while the hot pressed mixture 200 continued to fill cavity 120.

When body 100 had cooled sufficiently to permit handling, it was removed from mold 14, and immersed in water. Thereupon, the entire mixture was readily removed by reaction between the calcium carbide and the water, leaving the hot pressed body 100 and cavity 120 of the desired size and shape, as shown in FIG. 3.

Figures 4, 5, 6:
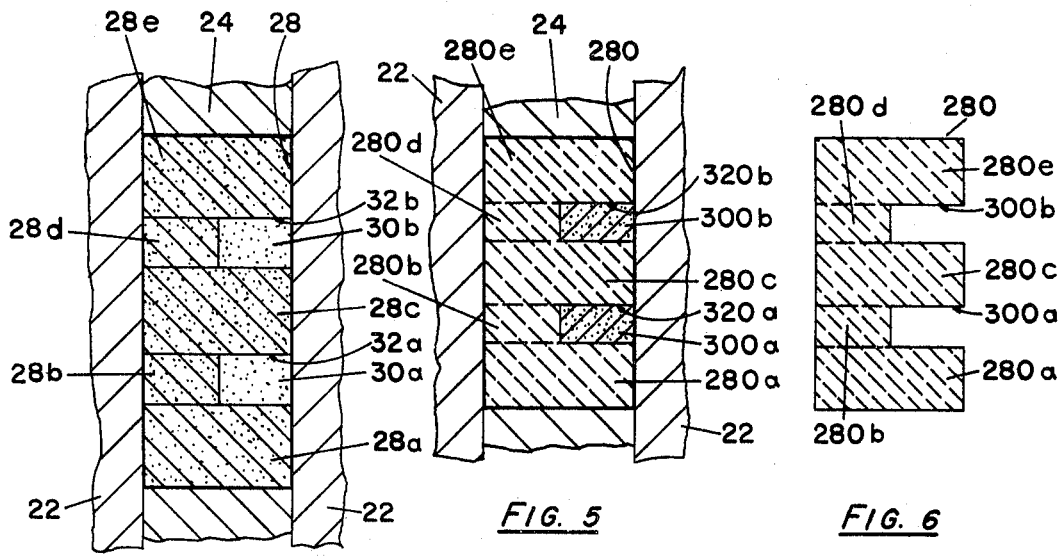
FIG. 4 is a fragmentary sectional view similar to FIG. 1, but showing an oversize serrated refractory carbide body having oversize cavities filled with a water-reactive carbide forming or containing mixture and placed in a mold prior to the hot pressing operation.
FIG. 5 is a view similar to FIG. 4, but following the hot pressing operation.
FIG. 6 is a sectional view of the hot pressed serrated body having shaped cavities following removal of the filling.

Referring to FIGS. 4–6, which are generally to scale, but enlarged in the horizontal direction to more clearly illustrate structural details, the inventive method is shown as applied to forming a serrated hot pressed refractory carbide body having shaped cavities or serrations in accordance with the following examples.

EXAMPLE 2

Fifty grams of niobium carbide having a particle size of −325 mesh was loaded into a cylindrical graphite mold 22 having an internal diameter of 1 inch and oppositely disposed plungers 24, 26. This was lightly compressed to form circular bottom layer 28a of oversize body 28. Then, a 1 inch wide sheet metal divider (not shown) was set on edge into the mold touching the layer 28a. One side was loaded with 12.5 grams of the niobium carbide and the other side with an equal volume of a water-reactive carbide containing mixture, both sides being lightly compressed to the same height to form semi-circular layers 28b of body 28 and 30a of the mixture filling lower oversize cavity 32a of the body. The water-reactive carbide containing mixture was composed of, by volume, 25 percent calcium carbide having a particle size range of +60 −40 mesh and 75 percent amorphous carbon having a particle size range of +600 −325 mesh.

Another, intermediate circular layer 28c of 50 grams of niobium carbide was loaded and compressed above the divided layers 28b, 30a, followed by loading and compressing of corresponding divided layers 28d, 30b and the final or top layer 28e corresponding to layers 28a and 28c. Thus, the oversize serrated refractory carbide body 28 was completed to have the following approximate dimensions, an outer diameter of 1 inch, an overall height of 3½ inches and three circular layers 28a, 28c, 28e each ⅝ inch thick and separated by two oversize cavities 32a, 32b each ½ inch thick and filled with layers 30a, 30b, respectively, of the water-reactive carbide containing mixture.

Body 28 was heated in an induction furnace (not shown) under argon and only contact pressure by plungers 24, 26 up to the hot pressing temperature of 1500° C. At this temperature, the plungers 24, 26 were actuated to increase the positively applied mechanical pressure to the maximum of 1000 pounds per square inch, which was held for 20 minutes until the hot pressing operation was completed, with the total time of the run being 77 minutes. At this point, the furnace was shut off and the pressure released during cooling.

As shown in FIG. 5, the resulting hot pressed refractory carbide body 280 was reduced to the desired size and shape, having the same outer diameter as body 28, but a shorter length of about 2⅝ inch, the thickness of layers 280a, 280c, and 280e being reduced to about ⅝ inch each, and the thickness of cavities 320a, 320b and layers 280b, 280d being reduced to about ⅜ inch each, with the hot pressed mixture of layers 300a and 300b filling cavities 320a, 320b.

When body 280 had cooled sufficiently to permit handling, it was removed from mold 22 and immersed in water. Within 10 minutes, most of the moderate and steady reaction between the water-reactive carbide and the water was completed permitting ready removal of layers 300a, 300b. It was noted that while $C_2H_2$ was evolving during the reaction, it literally "kicked" the excess carbon out into the water, thereby assisting in ejection of the layers 300a, 300b from cavities 320a, 320b, respectively. When removed from the water, the hot pressed body 280 and cavities 320a, 320b were of the desired size and shape, as shown in FIG. 6.

EXAMPLE 3

Example 2 was repeated, except that the water-reactive carbide containing mixture of layers 30a, 30b was composed of, by volume, 10 percent aluminum carbide having a particle size of −200 mesh and 90 percent carbon. Actually a combination, by volume, of 75 percent aluminum carbide and 25 percent graphitic carbon having a particle size of −200 mesh was mixed with enough amorphous carbon having a particle size range of +600 −325 mesh to provide the aforesaid mixture.

Following completion of the 68 minute run and cooling, body 280 was immersed in water, as before. While the reaction was slow, it was steady, and eventually layers 300a and 300b disintegrated and dropped out leaving a serrated body of the desired size and shape.

EXAMPLE 4

Example 2 was repeated, except that the water-reactive carbide forming mixture of layers 30a, 30b was composed of, by volume, 6.5 percent aluminum having a particle size of 270 mesh and 93.5 percent amorphous carbon having a particle size range of +600 −325 mesh. The purpose of this mixture was to produce a partially converted mixture during firing of, by volume, 10 percent aluminum carbide and 90 percent carbon.

Following the 80 minute run and cooling, body 280 was immersed in water with immediate reaction. Although the reaction was slow, it was steady, and eventually layers 300a and 300b disintegrated and dropped out, leaving a serrated body of the desired shape.

From the foregoing, it is now evident how the invention accomplishes the desired results and numerous advantages of the invention likewise are apparent. While the inventive method has been described and illustrated herein by reference to certain preferred embodiments, it is to be understood that various changes and modifications may be made therein by those skilled in the art without departing from the inventive concept, the scope of which is to be determined by the appended claims.

For example, while niobium carbide was used in the examples, the inventive method is equally applicable to hot pressing various refractory carbides, such as ZrC, HfC, SiC, TaC, and $B_4C$. Likewise, a water-reactive carbide forming mixture composed of calcium and carbon could be used in the inventive method, provided calcium of sufficiently small particle size, on the order of about −200 mesh is employed and care is taken to prevent oxidation.

We claim:

1. A method of forming a hot pressed nonwater-reactive refractory carbide body having a shaped cavity comprising the steps of hot pressing to size and shape an oversize non-water-reactive refractory carbide body having an oversize cavity filled with a water-reactive carbide forming or containing mixture following heating of said oversize body above said reactive carbide forming temperature, said hot pressing being carried out at a temperature and pressure and for a time suitable for forming said nonwater-reactive refractory carbide into a body of the desired final size and shape, and then removing said mixture from said cavity by reacting said reactive carbide with water.

2. The method of claim 1 wherein said hot pressing temperature ranges from about 1500° C. to about 2000° C.

3. The method of claim 1 wherein said mixture is composed of carbon and a material selected from the group consisting of calcium carbide, calcium, aluminum carbide and aluminum.

4. The method of claim 2 wherein said mixture is composed of carbon and a material selected from the group consisting of calcium carbide, calcium, aluminum carbide and aluminum.

5. The method of claim 2 wherein said pressure ranges from about 1000 to about 3000 pounds per square inch.

6. The method of claim 5 wherein said pressure is increased at a temperature ranging from about 1000° C. to about 1500° C. to a maximum ranging from about 1000 to about 3000 pounds per square inch which is maintained at said temperature ranging from about 1500 to about 2000° C. for a time of about 20 minutes to complete said hot pressing step.

7. The method of claim 6 wherein said oversize body is preformed into a generally cup-shaped by cold pressing prior to said hot pressing step, and said pressure is increasd to a maximum of about 3000 pounds per square inch which is maintained at said temperature of about 2000° C. for said time of about 20 minutes to complete said hot pressing step.

8. The method of claim 6 wherein said oversize body is formed into a serrated shape having oversize cavities filled with said reactive carbide containing mixture prior to said hot pressing step, and said pressure is increased to a maximum of about 1000 pounds per square inch which is maintained at said temperature of about 1500° C. for said time of about 20 minutes to complete said hot pressing step.

References Cited

UNITED STATES PATENTS

| | | | |
|---|---|---|---|
| 2,535,180 | 12/1950 | Watson | 264—332 |
| 2,883,729 | 4/1959 | Ito | 264—320 |
| 3,116,137 | 12/1963 | Vasilos et al. | 264—332 |
| 3,136,831 | 6/1964 | Zinn | 264—317 |

DONALD J. ARNOLD, Primary Examiner

U.S. Cl. X.R.
264—65, 233, 332, 344